(12) United States Patent
Edwards

(10) Patent No.: US 6,693,940 B2
(45) Date of Patent: Feb. 17, 2004

(54) LASER ROD PUMP CHAMBER AND METHOD

(75) Inventor: Glyn Edwards, Crick (GB)

(73) Assignee: GSI Lumonics Ltd., Rugby (GB)

( * ) Notice: Subject to any disclaimer, the term of this patent is extended or adjusted under 35 U.S.C. 154(b) by 0 days.

(21) Appl. No.: 10/293,194

(22) Filed: Nov. 13, 2002

(65) Prior Publication Data
US 2003/0095581 A1 May 22, 2003

(30) Foreign Application Priority Data

Nov. 19, 2001 (EP) .............................................. 01309719

(51) Int. Cl.[7] ................................................ H01S 3/03
(52) U.S. Cl. ........................................... 372/65; 372/98
(58) Field of Search ...................................... 372/65, 98

(56) References Cited

U.S. PATENT DOCUMENTS

| 3,563,899 A | * | 2/1971 | Coe ........................ 252/62.63 |
| 3,665,337 A | * | 5/1972 | Koechner .................... 372/33 |
| 3,718,868 A |   | 2/1973 | Pao et al. |
| 3,891,945 A | * | 6/1975 | Schlossberg et al. ......... 372/35 |
| 5,081,636 A | * | 1/1992 | Bishop ....................... 372/72 |
| 5,405,172 A |   | 4/1995 | Mullen |
| 2002/0117719 A1 | * | 8/2002 | Ando et al. ................ 257/347 |
| 2003/0063639 A1 | * | 4/2003 | Yatskar et al. .............. 372/36 |
| 2003/0095581 A1 | * | 5/2003 | Edwards ...................... 372/72 |

FOREIGN PATENT DOCUMENTS

| DE | 199 24 290 A 1 | 11/2000 |
| GB | 1 559 291 | 1/1980 |

* cited by examiner

Primary Examiner—Leon Scott, Jr.
(74) Attorney, Agent, or Firm—Samuels Gauthier & Stevens

(57) ABSTRACT

A solid state laser, includes laser rod tubes (10, 117) crimped onto each end of a laser rod (15, 121) with PTFE seal rings (25, 118) compressed between the laser rod and the laser rod tube. The compressed seal rings provide an improved leak tight seal in a laser pumping chamber. Each laser rod tube (10) provides a mounting and holding area (20) for supporting the laser rod ends therein while protecting and sealing the end faces of the laser rod. A swaging tool (40) and method for swaging the laser rod tube (10) onto the laser rod (15) to provide a compression fit are provided. The compression seal and swaging method are usable in a variety of leak tight sealing applications.

17 Claims, 3 Drawing Sheets

LASER ROD PUMP CHAMBER AND METHOD

FIELD OF INVENTION

The present invention relates to solid state lasers and the manufacture of same. More particularly, the present invention relates to mounting a laser rod tube into a pumping chamber of a solid state laser.

BACKGROUND

It is common practice in the laser industry to attach a laser rod tube to the end of a laser rod. Such tubes provide a convenient means for handling the rod and fixing it into a pumping chamber assembly of a solid state laser.

To be effective, the laser rod tube must be securely attached to the laser rod. Solid state lasers are typically water-cooled, so the joint between the rod tube and the laser rod must also be leak tight.

Because the joint area is exposed to laser radiation, common seal materials, such as the elastomers used in O-rings or adhesives, can be damaged by this radiation. This in turn often results in seal failures or contamination of the laser rod faces by the material given off by the seal.

It is known that PTFE (Teflon™) is a material that is highly resistant to damage by laser radiation. Based on this knowledge, it has been previously proposed to use PTFE as a sealing material for the joint between the rod tube and the laser rod in order to avoid the seal failures and/or contamination of the laser rod faces experienced when common seal materials are used to seal the joint.

However, PTFE seals are difficult to compress. Attempts to use traditional techniques to form a compression joint between the rod tube and the laser rod with a PTFE seal have been unsuccessful. This has been due to the inability, using such techniques, to sufficiently compress the PTFE seal so as to achieve reliable leak tight sealing at the joint.

Accordingly, more recently developed techniques, such as those using two part threaded rod tubes or flanged clamps, have been proposed to compress the PTFE seal to form the required compression joint between the rod tube and the laser rod. However, even using these techniques, space constraints around the laser rod end make it difficult to achieve the necessary forces required to compress the PTFE seal and thereby form an effective long term leak tight joint between the rod tube and the laser rod. Furthermore, even where these techniques can be used successfully to initially form a leak tight joint between the rod tube and the laser rod, subsequent cold flow of the PTFE can lead to seal failures over time.

Accordingly, a need exists for a simple, effective technique to mount a laser rod tube into a pumping chamber of a solid state laser such that a leak tight joint is formed between the rod tube and the laser rod and previously experienced problems are avoided.

While the invention is described below with reference to preferred embodiment(s), it should be understood that the invention is not limited thereto. Those of ordinary skill in the art having access to the teachings herein will recognize additional implementations, modifications, and embodiments, as well as other fields of use, which are within the scope of the invention as disclosed and claimed herein and with respect to which the invention could be of significant utility.

SUMMARY DISCLOSURE OF THE INVENTION

In accordance with the invention, a laser rod is mounted to a laser rod tube, by inserting an end of a laser rod into an end portion of a laser rod tube. The laser rod tube end portion has an inner diameter larger than the outer diameter of the laser rod. Preferably, the inner diameter of the portion of the laser rod tube adjacent to the laser rod tube end portion is smaller than the inner diameter of the end portion. Typically, this adjacent portion of the tube extends for the remainder of laser rod tube and forms the primary portion of the tube.

One or more seal rings, preferably three Teflon™ seal rings, are inserted into the laser rod tube end portion so as to be disposed between the inner diameter of the laser rod tube end portion and the outer diameter of the inserted laser rod end. Beneficially, each seal ring has a substantially square cross section, and a chamfered outer diameter to make it easier to insert into the tube. It is beneficial that each seal ring has an interference fit between its inner diameter and an outer diameter of the laser rod. Additionally an interference fit between the outer diameters of each seal ring will beneficially have an interference fit with the inner diameter of the laser rod tube end portion such that a pressing force is applied to press the seal rings between the laser rod and the laser rod tube.

With the rod and seal ring(s) inserted, the laser rod tube end portion is deformed or swaged to compress the inserted seal ring(s). Preferably, with the seal ring(s) inserted, the laser rod tube end portion extends beyond the inserted seal ring(s), in the opposite direction to that in which the laser rod end extends into the laser rod tube. This extended portion of the tube end portion is commonly referred to as the lip. The lip is typically swaged to enclose the seal ring(s) completely within the laser rod tube, and form a leak proof seal between the laser rod tube and the laser rod. A swaging force is applied which is sufficient to compress the seal ring(s).

The result is an assembly, in which the laser rod end is located within a laser rod tube, with at least one seal ring disposed between the laser rod tube and the laser rod in a swaged end portion of the laser rod tube. Beneficially, each seal ring in the assembly is made of Teflon™, has a chamfered outer diameter, and has a substantially square cross section. The seal ring(s) within the assembly are preferably compressed and form a leak proof seal between the laser rod tube and the laser rod, with the swaged end portion completely enclosing the seal ring(s) within the laser rod tube.

In a practical implementation of the invention a solid state laser may be formed by providing laser pump chamber formed within a chamber housing. The laser includes at least one flash lamp disposed within the chamber for pumping at least one laser rod disposed within the chamber for being pumped by the flash lamp. Within the chamber there is provided at least one swaged seal joint compressing at least one Teflon seal ring disposed within the chamber and the at least one swaged seal joint may be used at any joint where a high reliability leak proof radiation resistant seal my be required. The chamber may further include at least one reflector for reflecting flash lamp radiation onto the laser rod and the chamber may be dry or flooded with a cooling fluid for cooling elements disposed therein. In a particularly beneficial implementation each laser rod within the chamber includes two opposing ends. A laser rod tube is attached at each end of the laser rod for supporting the laser rod and for keeping the end face of the laser rods protected. In this case each laser rod tube is attached to the laser rod by swaged seal joint compressing three square cross-sectional Teflon seal rings.

The swaged seal joint is easily adapted for use in other applications. For example, the swaged seal joint can be used to seal a flow tube and end block in a pumping chamber. The joint can also be easily adapted to uses outside the field of solid state lasers. Thus, those skilled in the art will recognize that any rod type structure and tube type structure could be substituted for the laser rod and laser rod tube described herein and should be considered equivalents thereto for purposes of this invention.

BEST MODE FOR CARRYING OUT THE INVENTION

As will be described in detail below, the present invention provides an improved technique for mounting a laser rod into a pumping chamber 100 of a solid-state laser. The improved technique relies upon the use of a PTFE seal to form a leak tight compression joint between the rod tube and the laser rod. The joint provides the necessary mechanical support and water sealing, and will not be damaged by stray laser radiation or be subject to cold flow of the PTFE, which can lead to seal failure. Accordingly, the joint provides a more robust and reliable mounting as compared to previously proposed mountings. It is also simple and easy to assemble and disassemble.

Figure 1:
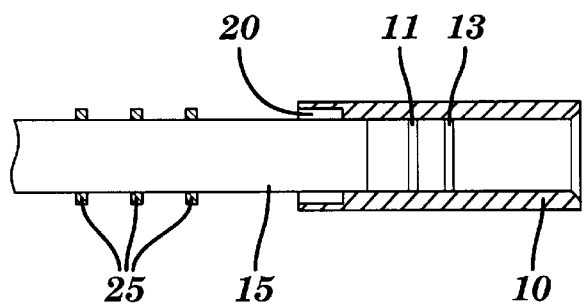
FIG. 1 depicts components used to mount a laser rod tube into a pumping chamber of a solid state laser, in accordance with the present invention.
Figure 3:
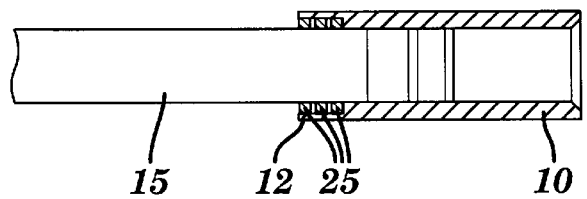
FIG. 3 depicts the components of FIG. 1 with the seal rings installed between the laser rod and the rod tube, in accordance with the present invention.
Figure 4:
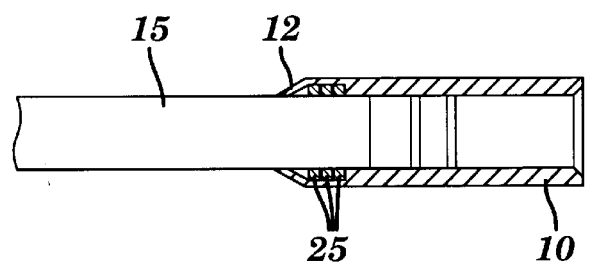
FIG. 4 depicts the lip of the rod tube swaged over the installed seal rings, in accordance with the present invention.

FIGS. 1, 3 and 4 depict three stages in the mounting of a laser rod into a laser rod tube of a pumping chamber in a solid state laser. As will be described further below, FIG. 1 shows basic components. FIG. 3 shows the seal rings installed between the laser rod and the rod tube. FIG. 4 shows the lip of the rod tube swaged over the seal rings to provide the final leak proof compression joint.

More particularly, FIG. 1 depicts a simple single-piece rod tube 10 positioned over the end of a laser rod 15. The rod tube 10 comprises a solid outer tube wall with several bore diameters passing completely therethrough. The tube rod 10 further includes a larger bore diameter open bore area 20 at one end thereof into which the laser rod 10 and one or more PTFE seal rings 25 are inserted to form a seal. The rod tube 10 may further include laser beam apertures at walls 11 and 13 but essentially functions as a rod holding and sealing element while allowing laser energy to pass through the central bore(s). It is a further function of the rod tube 10 that it forms a portion of a leak proof seal between the laser rod and other portions of the pump chamber 100 as will be described below.

Figure 2:
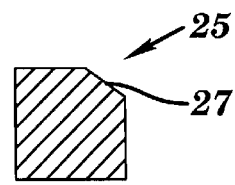
FIG. 2 is a cross sectional view of one of the seal rings depicted in FIG. 1.

FIG. 2 depicts an enlarged cross-sectional view of one example of a seal ring 25. Each seal ring preferably has a square cross-section as shown. However, a rectangular, round or other type seal ring cross-section may be suitable depending on the implementation. Each seal ring also has a chamfered outer diameter 27 to aid in its entry into the open bore area 20 of the rod tube 10.

Returning to FIG. 1, the laser rod 15 and rod tube 10 are held securely in their correct relative positions as the seal rings 25 are inserted into the open bore 20. As will be understood by those skilled in the art, a convention assembly jig (not shown) can be easily adapted to securely hold the rod 15 and tube 10 in place while inserting the rings 25 into the bore 20. The seal rings 25 are formed so as to fit tightly between the rod 15 and rod tube 10. Preferably the inner diameter of each seal ring 25 is dimensioned so as to have a slight interference fit on the rod 15. Thus, the seal rings 25 are preferably stretched to fit onto the outer diameter of the rod 15. The outside diameter of each seal ring 25 is also slightly larger than the bore in the open bore area 20 of the rod tube 10. Therefore, the seal rings 25 have an interference fit between the rod 15 and rod tube 10, and must be pressed into place in the open bore area 20. Thus pressed-in-place seals 25 provide the necessary handling strength for moving or otherwise handling the rod and rod tube assembly, prior to swaging of the rod end.

With the seal rings 25 inserted into the open bore 20 of the rod tube 10 as shown in FIG. 3, a lip 12 formed by the bore 20 at the end of the rod tube 10 projects beyond the seal rings 25. The lip 12 is swaged down over the seal rings 25. A crimping tool, of the type described below in detail with reference to FIGS. 5 and 6, may be used for this purpose.

As shown in FIG. 4, this operation encloses the seal rings 25 completely within the rod tube 10 and produces a large, but controlled, compression of the seal rings 25 behind the swaged lip 12. The force required to swage the lip 12 need only be sufficient to compress the PTFE seals 25 and deform the end of the tube. The necessary amount of force can be readily computed using well known engineering principles. Use of a swaging tool of the type described in detail below to form the swaged lip 12, will prevent over compression of the PTFE seals 25.

Extensive testing has verified that the above-described mounting is superior to previously proposed mountings employing a PTFE seals. As described above, the seal rings are quick and easy to install. The completed mounting, with the lip swaged over the seal rings, provides good handling strength, but can be easily removed if required without damaging the laser rod. The leak resistance has been excellent, and the mounting avoids the problem of laser rod face contamination that is common in mountings using adhesive or O-ring seals.

Figure 5:
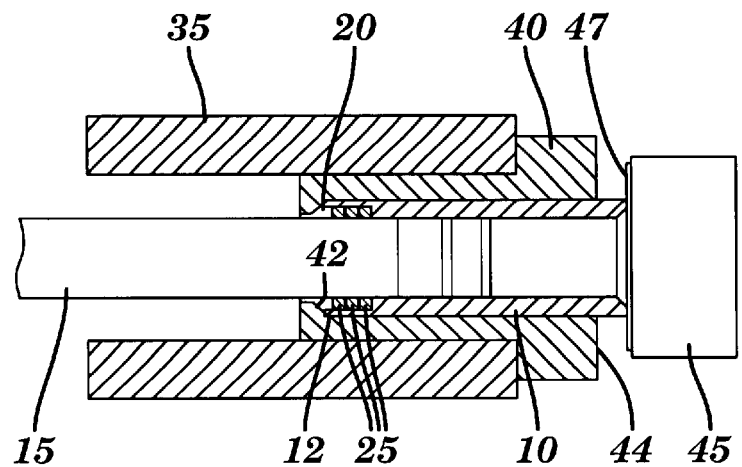
FIG. 5 depicts a crimping tool prior to swaging the lip of the rod tube in accordance with the present invention.

FIG. 5 shows the open bore area 20 of rod tube 10 positioned over an end of the laser rod 15, with three PTFE seal rings 25 positioned between the rod tube 10 and laser rod 15 within the open bore area 20. The open bore area 20 is inserted within the swaging tool. As shown, the open bore area 20, and more particularly the lip 12, has not, at this point, been swaged by the crimping tool.

The body 35 of the crimping tool is long enough to accommodate the full length of the laser rod 15 with a rod tube 10 fitted on each end of the laser rod 15. The collet 40 is split axially into two parts and has a tapered face 42. By axially splitting the collet 40, it can be easily positioned around the laser rod and rod tube assembly before being inserted into the body 35. The collet 40 swages the lip 12 of the open bore area 20 of the rod tube 10 when the lip 12 is forced against the tapered face 42. To force the lip 12 against the tapered face 42 of the collet 40, the rod tube 10 is pushed into the collet 40 by the cap 45. More particularly, the whole tool is placed under a press (not shown) that pushes on the cap 45, i.e. applies a compression force to the cap 45.

Figure 6:
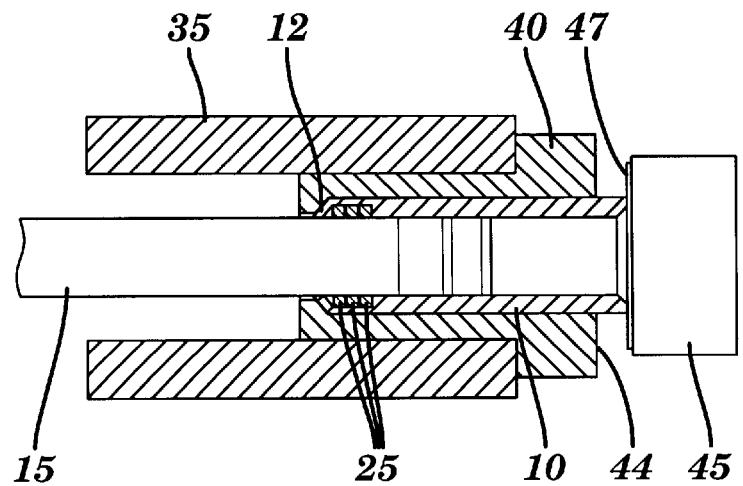
FIG. 6 depicts the crimping tool of FIG. 5 after swaging the lip of the rod tube in accordance with the present invention.

A press (not shown) continues to apply the compression force on the cap 45 until the surface 47 of the cap 45 makes contact with the face 44 of the collet 40, as shown in FIG. 6. The compression force actually applied to the lip 12 of the rod tube 10 and the seals 25 is determined solely by the force applied by the press and the dimensioning of the collet 40, as will be well understood by those skilled in the art. The force applied by the press need only be sufficient to bring the cap 45 into contact with the collet 40, and can be easily computed using well know engineering principles once the dimensions of the collet 40 have been established. Alternatively, if the force to be applied by the press is pre-defined, the dimensions of the collet 40 can be easily adapted using well know engineering principles to ensure that the compression force actually applied to the lip 12 of the rod tube 10 and the seals 25 will cause enough crimping of the lip 12 for the cap 45 to be placed into contact with the collet 40 by the pre-defined force.

Figure 7:
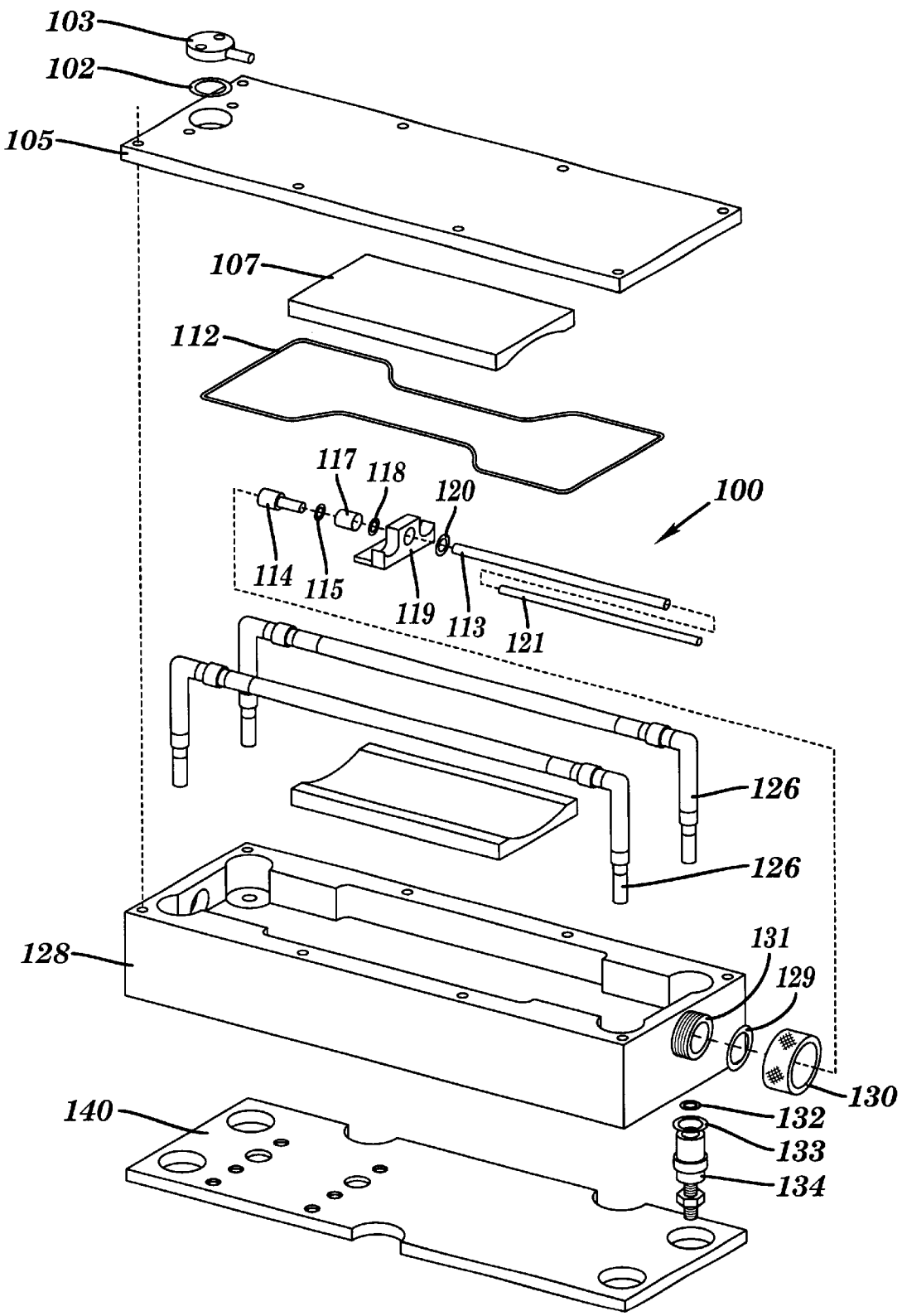
FIG. 7 depicts a pumping chamber of a solid state laser in accordance with the present invention.

FIG. 7 depicts the pumping chamber 100 of a solid-state laser in accordance with one example of the present invention. As shown, the pumping chamber 100 includes a water connector 103 with a water tube having a 5 mm bore for delivering cooling water into the chamber. The water connector is attached to a top plate 105 of the chamber, which may direct water flow as desired. An O-ring 102 seals the joint between plate 105 and connector 103. In the present example, water is pumped through the chamber for cooling the laser rod and the flash lamps. Water is also pumped though a flow tube 113, which houses the laser rod 121 therein. Since the chamber is flooded with cooling fluid, the pumping chamber is referred to as a wet system. Alternately, a dry system may pump a cooling fluid through the flow tube 113 housing the laser rod 121 and may also pump cooling fluid through additional flow tubes, (not shown but like 113), enclosing each flash lamp 126.

The top plate 105 attaches to the chamber body 128. An opposing base plate 140 is also attached to the chamber body 128 to form a leak proof pumping chamber housing. An O-ring 112 is positioned and forms a seal between the top plate 105 and the chamber body 128.

Housed within the chamber are flash lamps 126 and a split ceramic reflector 107 for reflecting flash lamp energy onto the laser rod 121. Lamp terminal 134 is positioned within the housing through an aperture in the base plate 140, which is also sealed by an O-ring 132 and O-ring 133 between the lamp terminal 134 and flash lamp 126. A rod tube clamp ring 130 is connected to a rod tube seal adapter 131 located on an exterior surface of the chamber body 128 for providing an exit path for the laser beam. An O-ring 129 seals the connection between the rod tube clamp ring 130 and rod tube seal adaptor 131. A laser rod and rod tube assembly are positioned in the chamber through the rod tube clamp ring 130. The rod assembly includes a YAG or other solid state laser rod 121, which is inserted into the flow tube 113. The flow tube 113 is connected to end block(s) 119 at each end thereof (only one is shown). Cooling fluid is delivered through the end block 119 and into the cooling tube 113, which is sealed from the chamber by the O-ring 120. The cooling fluid passes between the laser rod 121 and the cooling tube 113 and exits through the opposing end block 119, not shown. The same cooling fluid is then directed to the open cavity for additional cooling and is then pumped out of the cavity. A rod tube 117, like the one described above, holds the laser rod 121 with a compressed Teflon or PTFE seal ring 118 positioned between the rod tube 117 and the rod 121, and the end of the rod tube 117 is swaged forming a leak tight connection between the rod tube 117 and the rod 121 as has been discussed above. Similarly, a substantially identical rod tube 117 is attached to the laser rod 121 at its opposing end. Each rod tube 117 is then secured to the end block(s) 119. Other tubes, seals and apertures may also be provided, e.g. hollow end piece 114, rod tube seal adapter 131 and rod tube clamping ring 130, to essentially form an unobstructed path for laser energy to repeatedly pass back and forth through the laser rod 121 without obstruction and without leaking fluid from the laser pump chamber 100 and without contaminating the laser rod end faces.

It should be understood that the above described swaged seal joint could be utilized anywhere in the pumping chamber where an O-ring or other equivalent seal, such as a glue seal, is conventionally used. However, because the swaged seal joint is more expensive than conventional joints, in practice, swaged seal joints will typically only be used if a conventional joint is inadequate. Problems have in the past been experienced, for example, when using an O-ring to seal an end of the rod flow tube into the end block in certain pumping chambers where the O-rings are exposed to high levels of radiation. For example, in a dry pumping chamber a swaged seal joint in accordance with the present invention may be substituted for the conventional O-ring joint formed by O-ring 120 and the rod flow tube 113 and the end block 119. In addition, in a dry pumping chamber, a swaged seal joint may be used as a seal between lamps 126 and a flow tube encapsulating the lamps for cooling.

It will also be recognized by those skilled in the art that, while the invention has been described above in terms of one or more preferred embodiments, it is not limited thereto. Various features and aspects of the above-described invention may be used individually or jointly. Further, although the invention has been described in the context of its implementation in a particular environment and for particular purposes, e.g. solid state lasers, those skilled in the art will recognize that its usefulness is not limited thereto and that the present invention can be beneficially utilized in any number of environments and implementations. Accordingly, the claims set forth below should be construed in view of the full breath and spirit of the invention as disclosed herein.

I claim:

1. A method for mounting a laser rod to a laser rod tube, comprising:

inserting an end of a laser rod, having an outer diameter, into an end portion of a laser rod tube, the end portion having an inner diameter larger than the outer diameter of the laser rod;

inserting at least one PTFE seal ring so as to be disposed between the inner diameter of the laser rod tube end portion and the outer diameter of the laser rod; and swaging the laser rod tube end portion to compress the at least one inserted seal ring.

2. The method of claim 1, wherein the step of swaging of the laser rod tube end portion further comprises sufficiently compressing the at least one inserted seal ring for forming a leak proof seal between the laser rod tube and the laser rod.

3. The method of claim 1 further comprising the steps of:

forming an inner diameter of the at least one PTFE seal ring to have an interference fit with the outer diameter of the laser rod;

forming an outer diameter of the least one PTFE seal ring to have an interference fit with the inner diameter of the laser rod tube end portion; and, pressing the at least one seal ring between the laser rod and the laser rod tube prior to the swaging step.

4. The method of claim 1, further comprising the step of:

forming the laser rod tube end portion to extend beyond the at least one seal ring after insertion of the at least one seal ring between the laser rod and the laser rod tube such that a lip of the laser rod end tube extends over the laser rod; and swaging the lip to completely enclose the seal rings within the laser rod tube end portion.

5. The method of claim 4, further comprising the step of applying a swaging force sufficient to compress the at least one seal ring.

6. The method of claim 1, wherein the at least one seal ring is three seal rings.

7. A laser rod and tube assembly, comprising:

a laser rod tube having a swaged end portion;

a laser rod having an end disposed within the laser rod tube; and at least one PTFE seal ring disposed between the laser rod tube and the laser rod within the swaged end portion.

8. The assembly of claim 7, wherein the at least one seal ring is compressed between an inner diameter of the laser rod tube and an outer diameter of the laser rod within the swaged end portion.

9. The assembly of claim 8, wherein the compressed at least one seal ring forms a leak proof seal between the laser rod tube and the laser rod.

10. The assembly of claim 7, wherein each of the at least one seal ring has a substantially square cross section.

11. The assembly of claim 10, wherein each of the at least one seal ring has a chamfered outer diameter.

12. A solid state laser, comprising:

a chamber formed with a chamber housing;

at least one flash lamp disposed within the chamber for pumping the solid state laser;

at least one laser rod disposed within the chamber for being pumped by the flash lamp; and, at least one swaged seal joint compressing at least one PTFE seal ring disposed within the chamber.

13. The solid state laser of claim 12 further comprising at least one reflector for reflecting flash lamp radiation onto the laser rod.

14. The solid state laser of claim 12 further comprising a cooling fluid flooding the chamber for cooling elements disposed therein.

15. The solid state laser according to claim 12 wherein the at least one laser rod includes two opposing ends and wherein a laser rod tube is attached at each of the two opposing ends for providing a means for supporting the rod with respect to the chamber housing and wherein the at least one swaged seal joint is formed between the laser rod and the laser rod tubes attached thereto.

16. The solid state laser according to claim 15 wherein the at least one swaged seal joint compressing at least one PTFE seal ring comprises three PTFE seal rings.

17. The solid state laser according to claim 12 wherein the at least one swaged seal joint compressing at least one PTFE seal ring comprises three Teflon seal rings.

* * * * *